(12) United States Patent
Chikugo et al.

(10) Patent No.: US 11,501,421 B2
(45) Date of Patent: Nov. 15, 2022

(54) MACHINE DEVICE STATE MONITORING SYSTEM AND MACHINE DEVICE STATE MONITORING METHOD

(71) Applicant: Komatsu Ltd., Tokyo (JP)

(72) Inventors: Hiroyuki Chikugo, Tokyo (JP); Shuuji Hori, Tokyo (JP); Haruna Higashi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 41 days.

(21) Appl. No.: 16/957,923

(22) PCT Filed: Apr. 3, 2019

(86) PCT No.: PCT/JP2019/014796
§ 371 (c)(1),
(2) Date: Jun. 25, 2020

(87) PCT Pub. No.: WO2019/202990
PCT Pub. Date: Oct. 24, 2019

(65) Prior Publication Data
US 2021/0065352 A1  Mar. 4, 2021

(30) Foreign Application Priority Data

Apr. 16, 2018 (JP) .............................. JP2018-078593

(51) Int. Cl.
*G06T 7/00* (2017.01)
*G06F 16/535* (2019.01)

(52) U.S. Cl.
CPC .......... *G06T 7/0002* (2013.01); *G06F 16/535* (2019.01); *G06T 2207/10024* (2013.01)

(58) Field of Classification Search
None
See application file for complete search history.

(56) References Cited

U.S. PATENT DOCUMENTS

2003/0209647 A1* 11/2003 Miller ................... G01N 21/05
248/694
2012/0242982 A1* 9/2012 Ikeda ................... G01J 3/0218
356/213

(Continued)

FOREIGN PATENT DOCUMENTS

CN   103398923 A   11/2013
CN   103884506 A   6/2014

(Continued)

OTHER PUBLICATIONS

International Search Report dated Jun. 18, 2019, issued for PCT/JP2019/014796.

(Continued)

*Primary Examiner* — Bernard Krasnic
(74) *Attorney, Agent, or Firm* — Locke Lord LLP (57) ABSTRACT

A machine device state monitoring system includes an image data acquisition unit that acquires image data of an inside of a housing chamber in which a mechanical part is housed, an image analysis unit that outputs foreign substance data relating to a foreign substance in oil in the housing chamber based on the image data, a storage unit that stores characteristic data indicating a characteristic of the foreign substance, and an estimation unit that estimates a state of a machine device having the mechanical part based on the foreign substance data and the characteristic data to output estimation data.

7 Claims, 8 Drawing Sheets

(56) References Cited

U.S. PATENT DOCUMENTS

2018/0156324 A1 6/2018 Chikugo et al.
2018/0245490 A1 8/2018 Hori et al.

FOREIGN PATENT DOCUMENTS

| CN | 104764489 A | 7/2015 |
| CN | 106226071 A | 12/2016 |
| CN | 107667282 A | 2/2018 |
| JP | 58-201047 A | 11/1983 |
| JP | 2002-296151 A | 10/2002 |
| WO | 2014/112034 A1 | 7/2014 |
| WO | 2017/073734 A1 | 5/2017 |
| WO | 2017/208373 A1 | 12/2017 |

OTHER PUBLICATIONS

Office Action dated Oct. 8, 2021, issued in the corresponding Chinese patent application No. 201980006806.2.

\* cited by examiner

| | FIRST WORKING EQUIPMENT | SECOND WORKING EQUIPMENT | THIRD WORKING EQUIPMENT |
|---|---|---|---|
| FIRST MACHINE DEVICE | [VEHICLE INFORMATION] HIGH LOAD LEVEL, NO REPAIR HISTORY, ETC. | [VEHICLE INFORMATION] MEDIUM LOAD LEVEL, NO REPAIR HISTORY, ETC. | [VEHICLE INFORMATION] HIGH LOAD LEVEL, NO REPAIR HISTORY, ETC. |
| SECOND MACHINE DEVICE | [VEHICLE INFORMATION] MEDIUM LOAD LEVEL, NO REPAIR HISTORY, ETC. | [VEHICLE INFORMATION] HIGH LOAD LEVEL, NO REPAIR HISTORY, ETC. | [VEHICLE INFORMATION] HIGH LOAD LEVEL, SOME REPAIR HISTORY, ETC. |
| THIRD MACHINE DEVICE | [VEHICLE INFORMATION] LOW LOAD LEVEL, NO REPAIR HISTORY, ETC. | [VEHICLE INFORMATION] LOW LOAD LEVEL, NO REPAIR HISTORY, ETC. | [VEHICLE INFORMATION] MEDIUM LOAD LEVEL, NO REPAIR HISTORY, ETC. |

FIG.7

| | MECHANICAL PART A | MECHANICAL PART B | MECHANICAL PART C | MECHANICAL PART D |
|---|---|---|---|---|
| SHAPE | SHAPE OF ABRASION POWDER | SHAPE OF PEELED PIECE | SHAPE OF PEELED PIECE | SHAPE OF ABRASION POWDER |
| MAGNETIC PROPERTIES | NON-MAGNETIC | MAGNETIC | MAGNETIC | MAGNETIC |

MACHINE DEVICE STATE MONITORING SYSTEM AND MACHINE DEVICE STATE MONITORING METHOD

CROSS REFERENCE TO RELATED APPLICATIONS

This application a national phase entry of PCT/JP2019/014796 filed on Apr. 3, 2019, which claims priority to JP 2018-078593 filed on Apr. 16, 2018, both of which applications are assigned to the assignee of the present application and are incorporated by reference herein.

FIELD

The present invention relates to a machine device state monitoring system and a machine device state monitoring method.

BACKGROUND

Working equipment includes a plurality of machine devices. There has been proposed a technique of imaging, with an imaging device, a housing chamber of a machine device in which oil is stored.

CITATION LIST

Patent Literature

Patent Literature 1: International Publication No. 2017/073734

SUMMARY

Technical Problem

In order to reduce life cycle cost and improve an operating rate of a machine device, appropriate measures need to be taken by estimating a state of the machine device and detecting a sign of failure at an early stage before the machine device is damaged.

An aspect of the present invention aims to reduce a life cycle cost and improve an operation rate of a machine device by monitoring the state of the machine device and detecting a sign of a failure at an early stage.

Solution to Problem

According to an aspect of the present invention, a machine device state monitoring system comprises: an image data acquisition unit configured to acquire image data of an inside of a housing chamber in which a mechanical part is housed; an image analysis unit configured to output foreign substance data relating to a foreign substance in oil in the housing chamber based on the image data; a storage unit configured to store characteristic data indicating a characteristic of the foreign substance; and an estimation unit configured to estimate a state of a machine device having the mechanical part based on the foreign substance data and the characteristic data to output estimation data.

Advantageous Effects of Invention

According to an aspect of the present invention, since a state of the machine device can be monitored, and a sign of a failure can be detected at an early stage, a life cycle cost can be reduced and an operating rate can be improved regarding the machine device.

DESCRIPTION OF EMBODIMENTS

Hereinafter, an embodiment of the present invention will be described with reference to the drawings, but the present invention is not limited thereto. The components of the embodiment described below can be appropriately combined. In some cases, some components are not used.

[Machine Device]

Figure 1:
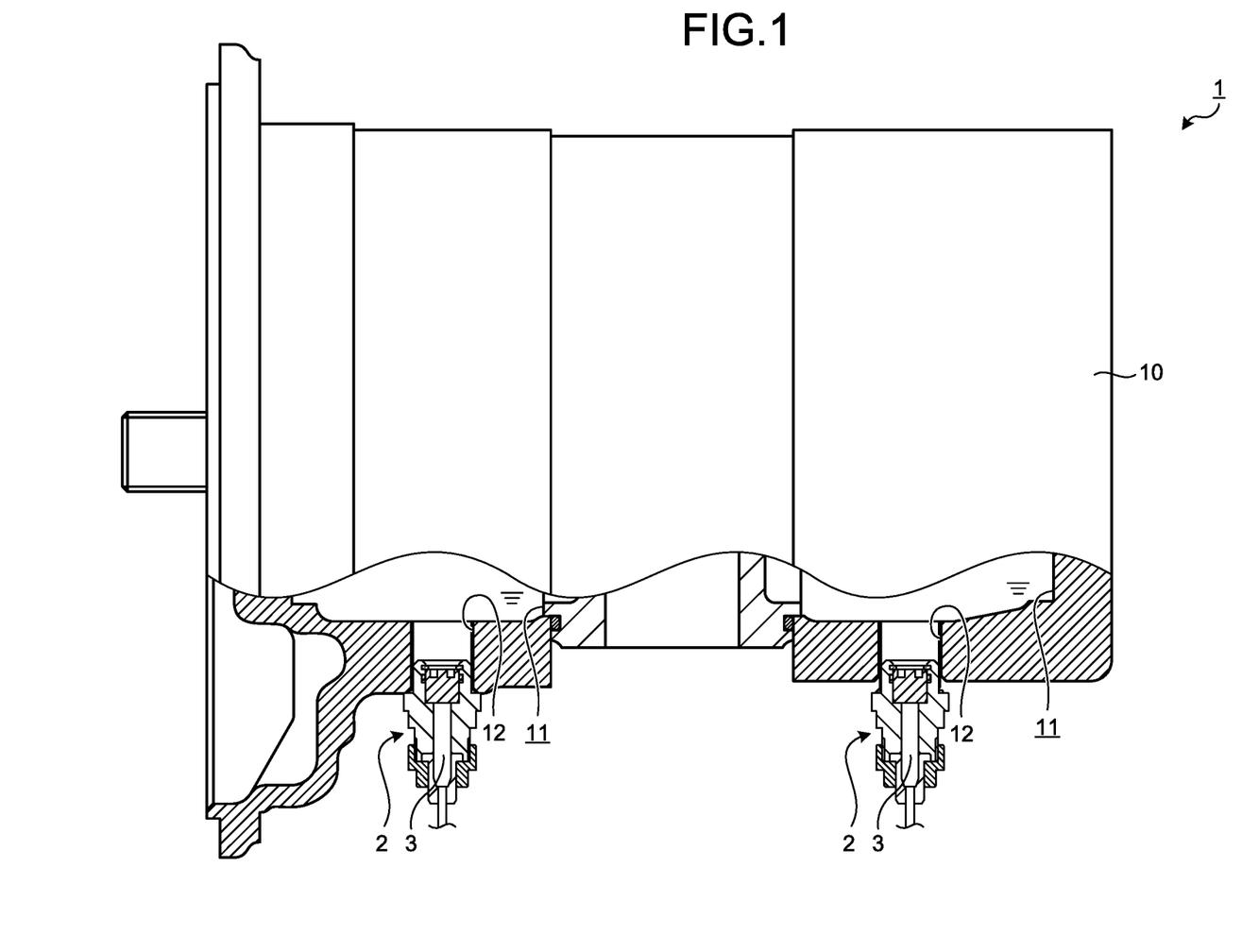
FIG. 1 is a diagram illustrating an example of a machine device according to the present embodiment.

FIG. 1 is a diagram illustrating an example of a machine device 1 according to the present embodiment. The machine device 1 is mounted on a piece of working equipment. As examples of the working equipment, at least one of a dump truck, an excavator, a wheel loader, and a bulldozer will be described. As the machine device 1, at least one of a hydraulic device such as a hydraulic pump, an engine, and an axle is exemplified. FIG. 1 illustrates at least a part of a hydraulic pump. The hydraulic pump supplies oil to a hydraulic actuator such as a hydraulic cylinder mounted on the working equipment.

The machine device 1 includes a device body 10 and a housing chamber 11 provided inside the device body 10. A mechanical part constituting at least a part of the machine device 1 is housed in the housing chamber 11. The housing chamber 11 is filled with oil. The mechanical part is housed in the housing chamber 11 in a state of being immersed in the oil. The oil in the housing chamber 11 lubricates and cools the mechanical part.

The mechanical part housed in the housing chamber 11 includes a rotating member such as a bearing, an output shaft rotatably supported by the bearing, and a gear as an example.

A visualization sensor 2 is mounted on the device body 10. The visualization sensor 2 refers to a sensor that includes at least an imaging device 3, visualizes a detection target, and detects the detection target. In other words, the visualization sensor 2 refers to a sensor that acquires image data of a detection target and detects the detection target. The visualization sensor 2 acquires image data inside the housing chamber 11 while being attached to the device body 10.

The device body 10 has a discharge hole 12 connecting a bottom of the housing chamber 11 and the outside of the housing chamber 11. The discharge hole 12 is a hole for discharging the oil in the housing chamber 11 to the outside. The discharge hole 12 is provided at a lowest position on the bottom surface of the housing chamber 11. The visualization sensor 2 is detachably attached in the discharge hole 12. The foreign substance in the oil settles and collects at the lowest position on the bottom surface of the housing chamber 11 due to the action of gravity. By providing the visualization sensor 2 at the lowest position on the bottom surface of the housing chamber 11, image data of the foreign substance in the oil that has settled and collected can be acquired.

Figure 2:
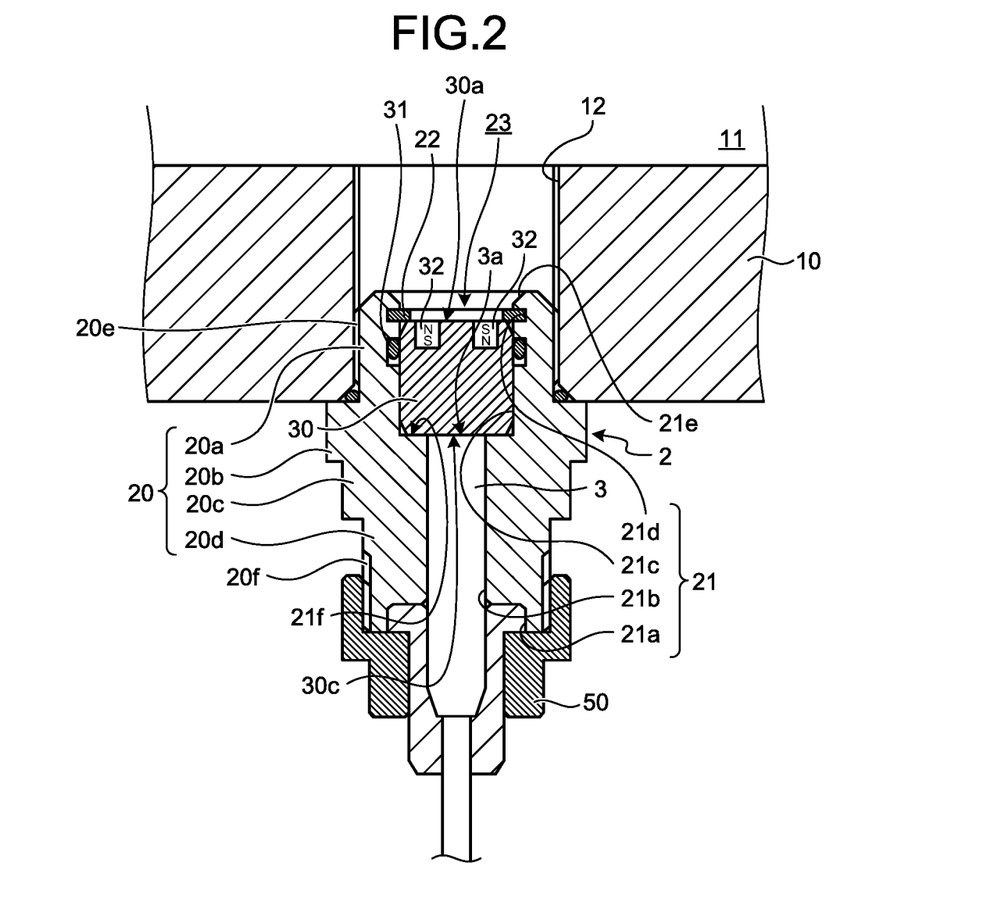
FIG. 2 is a side sectional view illustrating an example of a visualization sensor according to the present embodiment.
Figure 3:
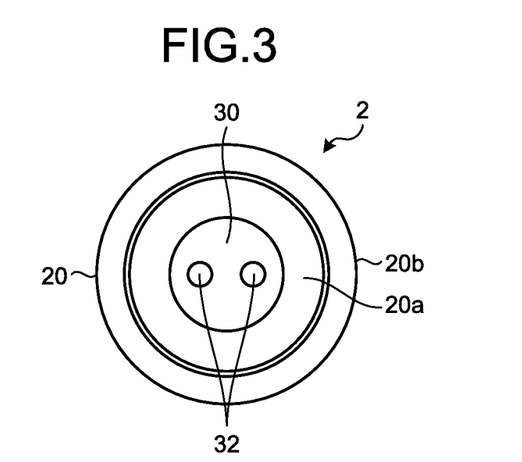
FIG. 3 is a plan view illustrating an example of the visualization sensor according to the present embodiment.

FIG. 2 is a side sectional view illustrating an example of the visualization sensor 2 according to the present embodiment. FIG. 3 is a plan view illustrating an example of the visualization sensor 2 according to the present embodiment.

The visualization sensor 2 includes a plug 20, a transparent spacer member 30 supported by the plug 20, magnets 32 embedded in the spacer member 30, and the imaging device 3 for capturing an image of the inside of the housing chamber 11 via the spacer member 30, and a cap member 50 attached to the plug 20.

The plug 20 has a shaft portion 20a, a flange portion 20b, a head portion 20c, and a cap attachment portion 20d. The plug 20 is a metal member. The shaft portion 20a is a portion that is coupled to the device body 10. On an outer peripheral surface of the shaft portion 20a, a screw thread 20e is provided. The shaft portion 20a is coupled to a screw groove provided on an inner peripheral surface of the discharge hole 12. The flange portion 20b is an annular portion having an outer diameter larger than an inner diameter of the discharge hole 12. The head portion 20c is a portion where a tool is engaged when the plug 20 is attached or detached. The cross section of the head portion 20c is a polygon such as a tetragon or a hexagon. The cap attachment portion 20d is a portion where the cap member 50 is attached. On an inner peripheral surface of the cap member 50, a screw groove is provided. The cap member 50 is coupled to a screw thread 20f provided on an outer peripheral surface of the cap attachment portion 20d.

The plug 20 has an attachment hole 21 penetrating through a lower end surface of the cap attachment portion 20d and an upper end surface of the shaft portion 20a. The attachment hole 21 has a grommet fitting hole 21a that opens at the lower end surface of the cap attachment portion 20d, a first housing hole portion 21b having an inner diameter smaller than the inner diameter of the grommet fitting hole 21a, and a second housing hole portion 21c having an inner diameter larger than the inner diameter of the first housing hole portion 21b, a ring attachment hole portion 21d having an inner diameter larger than the inner diameter of the second housing hole portion 21c, and a tapered hole portion 21e having an inner diameter that gradually enlarges toward an upper end. Between the first housing hole portion 21b and the second housing hole portion 21c, an annular pressure receiving surface 21f is provided. The pressure receiving surface 21f receives the hydraulic pressure applied via the spacer member 30.

To the ring attachment hole portion 21d, a C-ring 22 is attached. The spacer member 30 is placed at the second housing hole portion 21c. Between the spacer member 30 and the second housing hole portion 21c, a seal member 31 such as an O-ring is arranged. The imaging device 3 is placed at the first housing hole portion 21b.

The spacer member 30 is a transparent columnar member. The spacer member 30 is made of a synthetic resin such as polycarbonate. Note that the spacer member 30 may be made of glass. One end face 30a of the spacer member 30 contacts the C-ring 22, and another end face 30c of the spacer member 30 contacts the pressure receiving surface 21f. A concave portion 23 whose inner diameter gradually enlarges toward an upper end is defined by the inner surface of the tapered hole portion 21e and the end face 30a of the spacer member 30.

The magnet 32 is embedded in the spacer member 30. The magnet 32 is a permanent magnet. The magnet 32 has a columnar shape. One end face of the magnet 32 is the N pole, and another end face of the magnet 32 is the S pole.

The two magnets 32 are provided in the spacer member 30. The magnets 32 are arranged on both sides of a center axis of the spacer member 30. One of the magnet 32 is held by the spacer member 30 such that the end face of the N pole and the end face 30a of the spacer member 30 are arranged in the same plane. The other magnet 32 is held by the spacer member 30 such that the end face of the S pole and the end face 30a of the spacer member 30 are arranged in the same plane. Note that the number of magnets 32 may be one, two, or more.

The imaging device 3 captures an image of the inside of the housing chamber 11 via the transparent spacer member 30. The image data acquired by the imaging device 3 may be still image data or moving image data. According to the present embodiment, the image data acquired by the imaging device 3 is still image data.

An imaging range of the imaging device 3 substantially corresponds to the end face 30a of the spacer member 30. An incident surface 3a of the imaging device 3 contacts the end face 30c of the spacer member 30. With the incident surface 3a of the imaging device 3 being in contact with the end face 30c of the spacer member 30, a focal point of an optical system of the imaging device 3 matches the end face 30a of the spacer member 30.

The end face 30a of the spacer member 30 is disposed at the lowest position of the housing chamber 11. The end face 30a faces upward and faces the housing chamber 11. The end face 30a contacts the oil in the housing chamber 11. When a foreign substance such as abrasion powder is mixed in the oil, the foreign substance precipitates due to the action of gravity and accumulates on the end face 30a of the spacer member 30. The imaging device 3 can acquire image data of the foreign substance accumulated on the end face 30a of the spacer member 30.

Further, the magnets 32 are embedded in the spacer member 30. When the foreign substance is a magnetic material such as iron powder, the magnets 32 can attract the foreign substance to the end face 30a of the spacer member 30.

According to the present embodiment, two magnets 32 are arranged adjacent to each other. With this configuration, lines of magnetic force from one magnet 32 to the other magnet 32 are formed. Therefore, for example, when the foreign substance is large, the foreign substance is attracted across the two magnets 32.

[State Monitoring System]

Next, a state monitoring system 100 of the machine device 1 according to the present embodiment will be described. The state monitoring system 100 monitors the state of the machine device 1 via the visualization sensor 2. The state monitoring system 100 estimates the state of the machine device 1 based on the image data acquired by the imaging device 3 of the visualization sensor 2.

Figure 4:
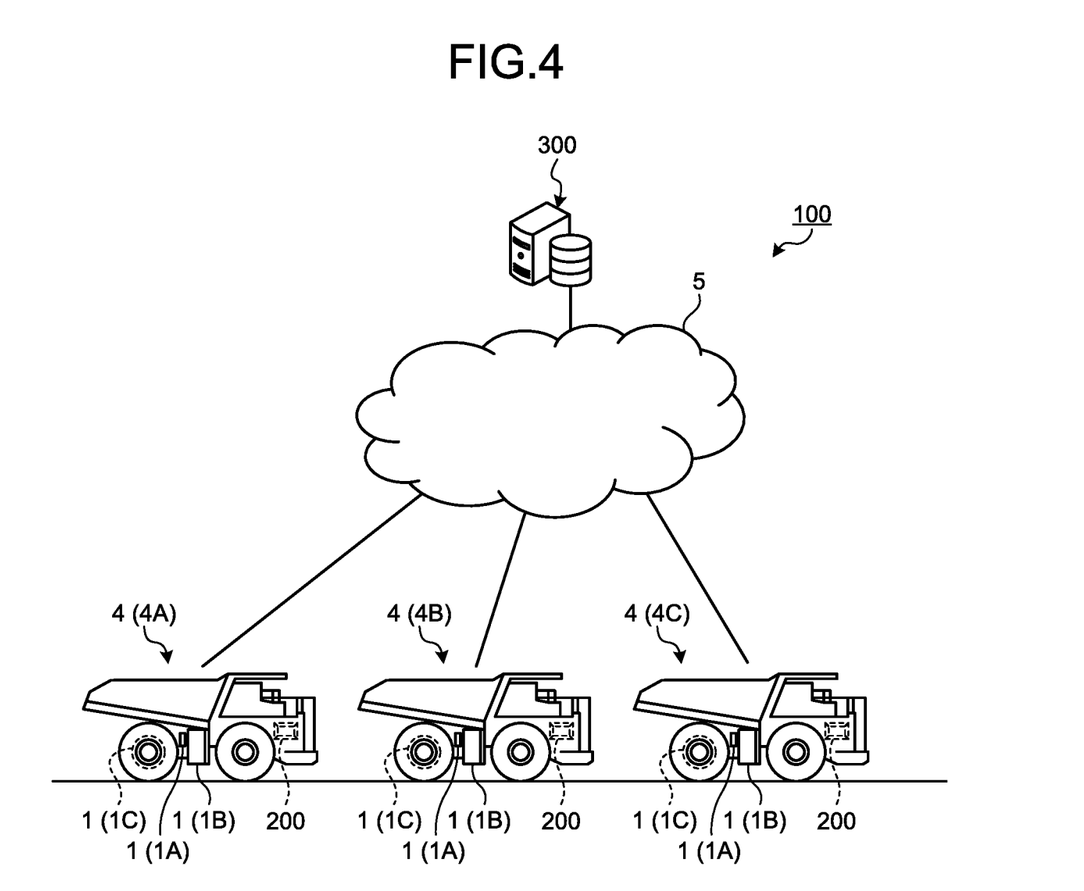
FIG. 4 is a diagram schematically illustrating an example of a state monitoring system according to the present embodiment.

FIG. 4 is a diagram schematically illustrating an example of the state monitoring system 100 according to the present embodiment. The state monitoring system 100 includes an in-vehicle control device 200 mounted on the working equipment 4, and a server 300 provided outside the working equipment 4. Each of the in-vehicle control device 200 and server 300 includes a computer system.

The in-vehicle control device 200 is connected to the visualization sensor 2. The imaging device 3 outputs the acquired image data to the in-vehicle control device 200.

The in-vehicle control device 200 and the server 300 can communicate with each other via a communication network 5. As the communication network 5, at least one of a local area network (LAN), the Internet, a mobile phone communication network, and a satellite communication network will be described as an example.

The in-vehicle control device 200 transmits the image data acquired by the imaging device 3 to the server 300. The server 300 acquires the image data of the housing chamber 11. The server 300 can communicate with each of plural pieces of working equipment 4. The plural pieces of working equipment 4 may be a same type or different types. According to the present embodiment, for the sake of simplicity, it is assumed that the plural pieces of working equipment 4 that can communicate with server 300 are first working equipment 4A, second working equipment 4B, and third working equipment 4C. The server 300 acquires image data from each of the first working equipment 4A, the second working equipment 4B, and the third working equipment 4C. The number of the pieces of working equipment 4 that can communicate with the server 300 may be only one, may be any number of four or more, or may be 10,000 pieces for example.

The working equipment 4 includes a plurality of machine devices 1. As described above, as the machine device 1, at least one of a hydraulic device such as a hydraulic pump, an engine, and an axle will be described as an example. In the present embodiment, for the sake of simplicity, the machine devices 1 of one piece of working equipment 4 are a first machine device 1A, a second machine device 1B, and a third machine device 1C. The visualization sensor 2 is provided in each of the first machine device 1A, the second machine device 1B, and the third machine device 1C. Note that the number of machine devices 1 included in one piece of working equipment 4 may be four or more.

The first machine device 1A is, for example, a hydraulic pump. The second machine device 1B is, for example, an engine. The third machine device 1C is, for example, an axle. The function of the first machine device 1A, the function of the second machine device 1B, and the function of the third machine device 1C are different.

The function of the first machine device 1A mounted on the first working equipment 4A, the function of the first machine device 1A mounted on the second working equipment 4B, and the first machine device 1A mounted on the third working equipment 4C are equivalent. In a similar manner, the functions of the second machine devices 1B mounted on each of the first, second, and third working equipment 4A, 4B, and 4C are equivalent. The functions of the third machine devices 1C mounted on each of the first, second, and third working equipment 4A, 4B, and 4C are equivalent.

Figure 5:
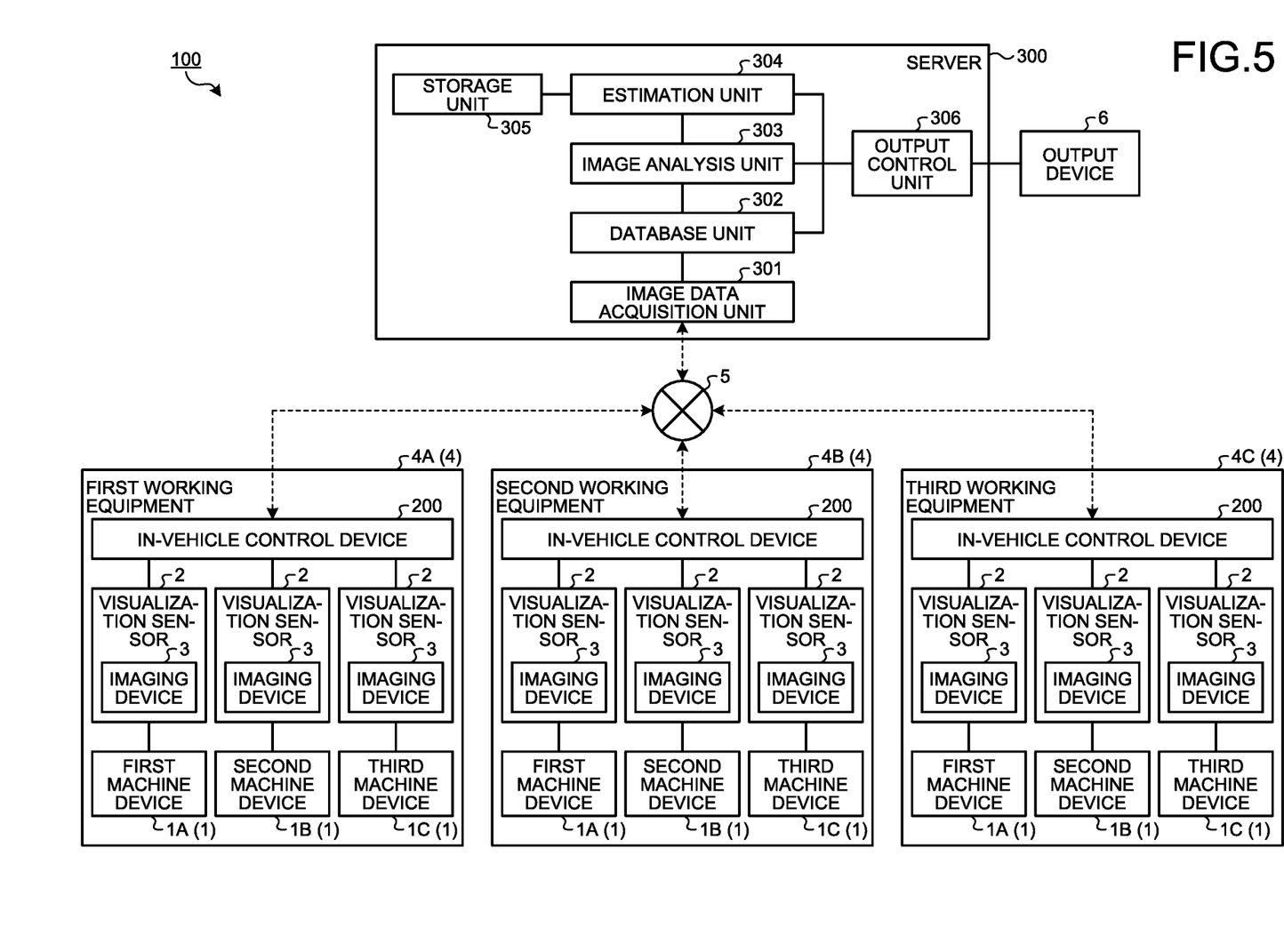
FIG. 5 is a functional block diagram illustrating an example of the state monitoring system according to the present embodiment.

FIG. 5 is a functional block diagram illustrating an example of the state monitoring system 100 according to the present embodiment. As illustrated in FIG. 5, the in-vehicle control device 200 is mounted on the working equipment 4. The server 300 communicates with the in-vehicle control device 200 via the communication network 5.

An output device 6 is connected to the server 300. The output device 6 may be a display device that outputs display data or a printing device that outputs a printed matter. As the display device, a flat panel display such as a liquid crystal display (LCD) or an organic electroluminescence display (OELD) will be described as an example.

The server 300 includes an image data acquisition unit 301, a database unit 302, an image analysis unit 303, an estimation unit 304, a storage unit 305, and an output control unit 306.

The image data acquisition unit 301 acquires image data of the inside of the housing chamber 11 captured by the imaging device 3. The image data acquisition unit 301 acquires the image data from the in-vehicle control device 200 via the communication network 5. The image data acquisition unit 301 acquires the image data of the inside of the housing chamber 11 of each of the plurality of machine devices 1 (1A, 1B, 1C) from each of the plural pieces of working equipment 4 (4A, 4B, 4C).

The database unit 302 stores the image data obtained by the image data acquisition unit 301. The database unit 302 stores image data of the inside of the housing chamber 11 of the first machine device 1A, image data of the inside of the housing chamber 11 of the second machine device 1B, and image data of the inside of the housing chamber 11 of the third machine device 1C. As described above, the functions of the first machine device 1A, the second machine device 1B, and the third machine device 1C are different. The database unit 302 stores the image data of the inside of the housing chamber 11 of the plurality of machine devices 1 (1A, 1B, 1C) having different functions.

Further, the database unit 302 stores the image data of the inside of the housing chambers 11 of the plurality of machine devices 1 (1A, 1B, 1C) of the first working equipment 4A. The database unit 302 stores the image data of the inside of the housing chambers 11 of the plurality of machine devices 1 (1A, 1B, 1C) of the second working equipment 4B. The database unit 302 stores the image data of the inside of the housing chambers 11 of the plurality of machine devices 1 (1A, 1B, 1C) of the third working equipment 4C. As described above, the functions of the first machine devices 1A are equivalent, the functions of the second machine devices 1B are equivalent, and the functions of the third machine devices 1C are equivalent, which are respectively mounted on the first, second, and third pieces of working equipment 4A, 4B, and 4C. The database unit 302 stores image data of the inside of the housing chambers 11 of the plurality of first machine devices 1A having the same function mounted on each of the plural pieces of working equipment 4 (4A, 4B, 4C). The database unit 302 stores image data of the inside of the housing chambers 11 of the plurality of second machine devices 1B having the same function mounted on each of the plural pieces of working equipment 4 (4A, 4B, 4C). The database unit 302 stores image data of the inside of the housing chambers 11 of the plurality of third machine devices 1C having the same function mounted on each of the plural pieces of working equipment 4 (4A, 4B, 4C).

Figure 6:
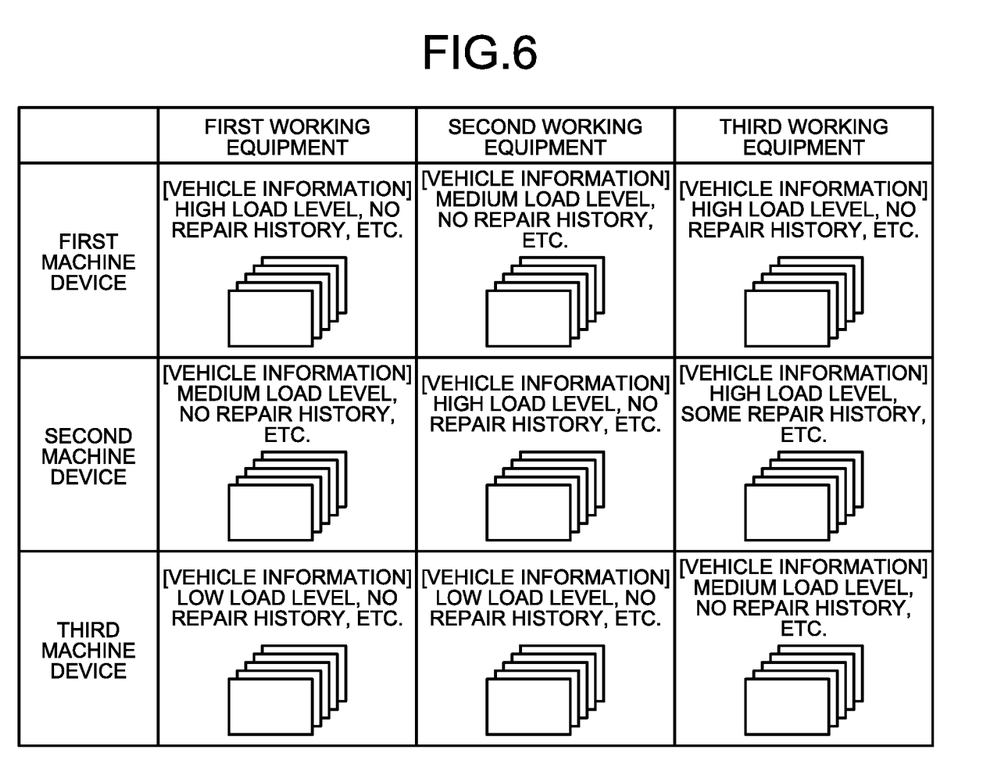
FIG. 6 is a schematic diagram illustrating an example of a database unit according to the present embodiment.

FIG. 6 is a schematic diagram illustrating an example of the database unit 302 according to the present embodiment. As illustrated in FIG. 6, the database unit 302 stores the image data related to the first machine device 1A, the image data related to the second machine device 1B, and the image data related to the third working equipment 4C, for each piece of the first working equipment 4A, the second working equipment 4B, and the third working equipment 4C.

The image analysis unit 303 analyzes foreign substance in the oil contained in the image data stored in the database unit 302 and outputs foreign substance data relating to the foreign substance in the oil in the housing chamber 11. The state of the machine device 1 is grasped and estimated by analyzing the presence/absence of foreign subject, the shape, size, amount, color, or the presence/absence of magnetic properties of the foreign substance, and the rate of increase of the foreign substance from the image data. Note that the image analysis and diagnosis may be performed by a human or performed automatically by using artificial intelligence (AI) or the like.

According to the present embodiment, the database unit 302 may store vehicle information (operating environment, load, repair history, maintenance, other sensor information, and the like) of the machine device 1 in association with the image data. With such a configuration, the state of the machine device 1 can be recognized in detail, and highly estimated.

For example, when a mechanical part is worn due to sliding movements of the mechanical part, abrasion powder is generated from the mechanical part as a foreign substance. Further, for example, when a part of the mechanical part is peeled off due to an impact acting on the mechanical part, the peeled piece is generated from the mechanical part as a foreign substance. The imaging device 3 can acquire color image data of the foreign substance generated from the mechanical part and accumulated on the end face 30a of the spacer member 30.

The image analysis unit 303 can perform image processing on the image data of the foreign substance generated from the mechanical part, and detect at least one of the amount, shape, size, and color of the foreign substance accumulated on the end face 30a of the spacer member 30. The image analysis unit 303 can process the image data of the foreign substance generated from the mechanical part to detect the amount of the foreign substance accumulated on the end face 30a of the spacer member 30. The image analysis unit 303 can detect the increase rate of the foreign substance indicating the amount of increase in the foreign substance on the end face 30a of the spacer member 30 per unit time based on the image data of the foreign substance generated from the mechanical part. The image analysis unit 303 can detect the color of the foreign substance accumulated on the end face 30a of the spacer member 30 based on the image data of the foreign substance generated from the mechanical part.

When the mechanical part is a magnetic material such as iron, the foreign substance generated from the mechanical part is a magnetic material. When the mechanical part is a non-magnetic material such as copper, the foreign substance generated from the mechanical part is a non-magnetic material. As described above, the magnets 32 are embedded in the spacer member 30. With this configuration, the accumulation state of foreign substance differs between the case where the foreign substance accumulated on the end face 30a of the spacer member 30 is a magnetic material and the case where the foreign substance is a non-magnetic material. When the foreign substance is a magnetic material, the foreign substance is concentrated on the magnets 32. When the foreign substance is a non-magnetic material, the foreign substance is not concentrated on the magnets 32 but is dispersed on the end face 30a of the spacer member 30. The image analysis unit 303 can process the image data of the foreign substance generated from the mechanical part to detect whether the foreign substance accumulated on the end face 30a of the spacer member 30 is a magnetic material.

The estimation unit 304 estimates the state of the machine device 1 having the mechanical part based on the foreign substance data output from the image analysis unit 303. The estimation unit 304 outputs estimation data indicating the estimation result of the state of the machine device 1. The foreign substance data indicates at least one of the amount, shape, size, and color of the foreign substance.

The estimation unit 304 can estimate the state of each of the plurality of machine devices 1 having different functions based on the foreign substance data detected from the image data of the database unit 302.

The estimation unit 304 can estimate the state of each of the plurality of different machine devices 1 of the working equipment 4 based on the foreign substance data detected from the image data of the database unit 302.

The estimation of the state of the machine device 1 includes an estimation of a deteriorated section of the mechanical part. For example, when a part of a gear as a mechanical part is peeled off, the peeled piece has a characteristic shape and size based on the shape of the gear. The estimation unit 304 can estimate that the deteriorated section (peeled section) of the mechanical part is the gear based on the shape and size of the foreign substance output from the image analysis unit 303. Further, when a first mechanical part made of a magnetic material and a second mechanical part made of a non-magnetic material are present in the housing chamber 11, an accumulation state of the abrasion powder generated from the first mechanical part and an accumulation state of abrasion powder generated from the second mechanical parts are different on the end face 30a of the spacer member 30.

When it is determined that the foreign substance is concentrated on the magnet 32 based on the foreign substance data indicating the accumulation state of the foreign substance output from the image analysis unit 303, the estimation unit 304 can estimate that the deteriorated section (abraded section) of the mechanical part is the first mechanical part. Further, when it is determined that the foreign substance is uniformly dispersed on the end face 30a of the spacer member 30 based on the foreign substance data indicating the accumulation state of the foreign substance output from the image analysis unit 303, the estimation unit 304 can estimate that the deteriorated section (abraded section) of the mechanical part is the second mechanical part.

According to the present embodiment, the storage unit 305 stores characteristic data indicating characteristics of the foreign substances. The characteristic data of the foreign substance indicates characteristics of the foreign substances that are expected to be generated from the mechanical parts. The characteristic data of the foreign substances includes at least one of the shape, size, color, and magnetism of the foreign substances. The characteristic data of the foreign substances is known data that can be derived from at least one of design data (specific data), a preliminary experiment, and a simulation of the mechanical part housed in the housing chamber 11. The design data of the mechanical part includes at least one piece of structural data, shape data, material data, and magnetic data of the mechanical part.

The estimation unit 304 estimates a deteriorated section of the machine device 1 based on the foreign substance data output from the image analysis unit 303 and the characteristic data stored in the storage unit 305.

Figure 7:
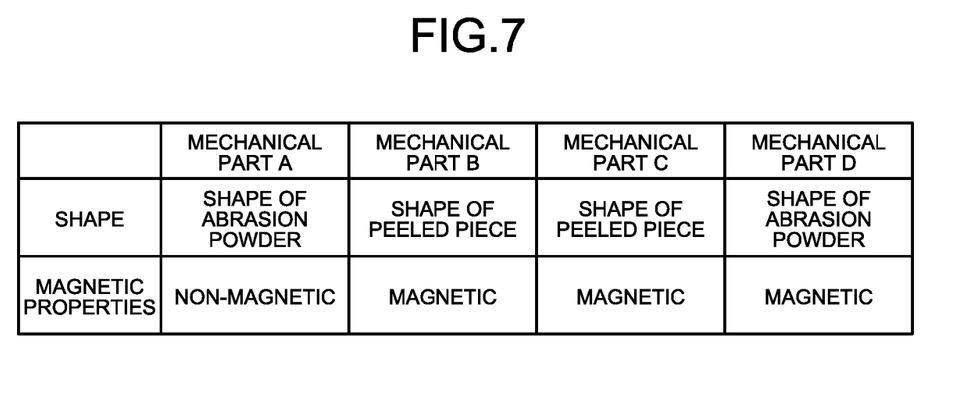
FIG. 7 is a schematic diagram illustrating an example of a storage unit according to the present embodiment.

FIG. 7 is a schematic diagram illustrating an example of the storage unit 305 according to the present embodiment.

As illustrated in FIG. 7, the storage unit 305 stores characteristic data of the foreign substances for each of the plurality of mechanical parts (mechanical parts A, B, C, and D) included in one machine device 1. FIG. 7 illustrates an example in which shape data indicating the shapes of the foreign substances and magnetic data indicating the magnetic property of the foreign substances are stored in the storage unit 305 as characteristic data of the foreign substances.

For example, when the mechanical part A is a sliding member such as a piston shoe, there is a low possibility that a peeled piece is generated from the mechanical part A, and a high possibility that abrasion powder is generated. Further, when the mechanical part A is formed of a non-magnetic material, the generated abrasion powder is non-magnetic. The storage unit 305 stores the shape of the abrasion powder and the non-magnetic property of the abrasion powder as characteristics of the foreign substance that is expected to be generated from the mechanical part A. Note that the size of the abrasion powder may be stored in the storage unit 305 as the characteristic of the foreign substance that is expected to be generated from the mechanical part A. As described above, the characteristic data indicating the characteristics of the foreign substance is known data that can be derived from design data (specific data), preliminary experiments, simulations, and the like of the mechanical parts.

For example, when the mechanical part B is a bearing, there is a high possibility that a peeled piece is generated from the mechanical part B. Further, when the mechanical part B is formed of a magnetic material, the generated peeled piece is magnetic. The storage unit 305 stores the shape of the peeled piece and the magnetic property of the peeled piece as characteristics of the foreign substance that is expected to be generated from the mechanical part B. Note that the size of the peeled piece may be stored in the storage unit 305 as the characteristic of the foreign substance that is expected to be generated from the mechanical part B.

For example, when the mechanical part C is a gear, there is a high possibility that a peeled piece is generated from the mechanical part C. Further, when the mechanical part C is formed of a magnetic material, the generated peeled piece is magnetic. The storage unit 305 stores the shape of the peeled piece and the magnetic property of the peeled piece as characteristics of the foreign substance that is expected to be generated from the mechanical part C. Note that the size of the peeled pieces may be stored in the storage unit 305 as the characteristic of the foreign substance that is expected to be generated from the mechanical part C.

In addition, as the characteristics of the foreign substance expected to be generated from the mechanical part D, the storage unit 305 stores the shape of the peeled piece and the magnetic property of the peeled piece, as the characteristics of the foreign substance expected to be generated from the mechanical part D. Note that the size of the peeled piece may be stored in the storage unit 305 as the characteristic of the foreign substance that is expected to be generated from the mechanical part D.

The estimation unit 304 can collate the characteristic data stored in the storage unit 305 with the foreign substance data output from the image analysis unit 303, and specify a deteriorated section of the mechanical part. For example, when the shape of the foreign substance detected by the image analysis unit 303 and the shape of the peeled piece of the mechanical part B stored in the storage unit 305 are equivalent or approximate to each other, the estimation unit 304 can estimate that the deteriorated section of the machine device 1 is the mechanical part B. In a similar manner, when the shape of the foreign substance detected by the image analysis unit 303 is equivalent or approximate to the shape of the peeled piece of the mechanical part C stored in the storage unit 305, the estimation unit 304 can estimate that the deteriorated section of the machine device 1 is the mechanical part C.

Further, when it is estimated that the foreign substance is abrasion powder based on the foreign substance data detected by the image analysis unit 303, the estimation unit 304 can estimate whether the abrasion powder is generated from the mechanical part A or whether the abrasion powder is generated from the mechanical part D based on the accumulation state of the abrasion powder on the end face 30a of the spacer member 30. As described above, the accumulation state of the abrasion powder on the end face 30a of the spacer member 30 differs between a non-magnetic material and a magnetic material. Therefore, the estimation unit 304 can estimate whether the abrasion powder is generated from the mechanical parts A or whether the abrasion powder is generated from the mechanical parts D based on the foreign substance data indicating the accumulation state of the abrasion powder. Even in a case where it is difficult to estimate the deteriorated section of the machine device 1 based on the shape of the foreign substance, the estimation unit 304 can estimate the deteriorated section of the machine device 1 based on the magnetism (the accumulation state of the abrasion powder).

Note that the item of the characteristic data of the foreign substance illustrated in FIG. 7 is an example. With more items of the characteristic data, the estimation unit 304 can estimate the deteriorated section of the machine device 1 with higher accuracy.

Further, estimation of the state of the machine device 1 includes estimation of the deterioration state of the machine device 1. The estimation of the deterioration state of the machine device 1 includes estimation of the life of the machine device 1. The estimation unit 304 can estimate the deterioration state of the machine device 1 based on the foreign substance data.

Figure 8:
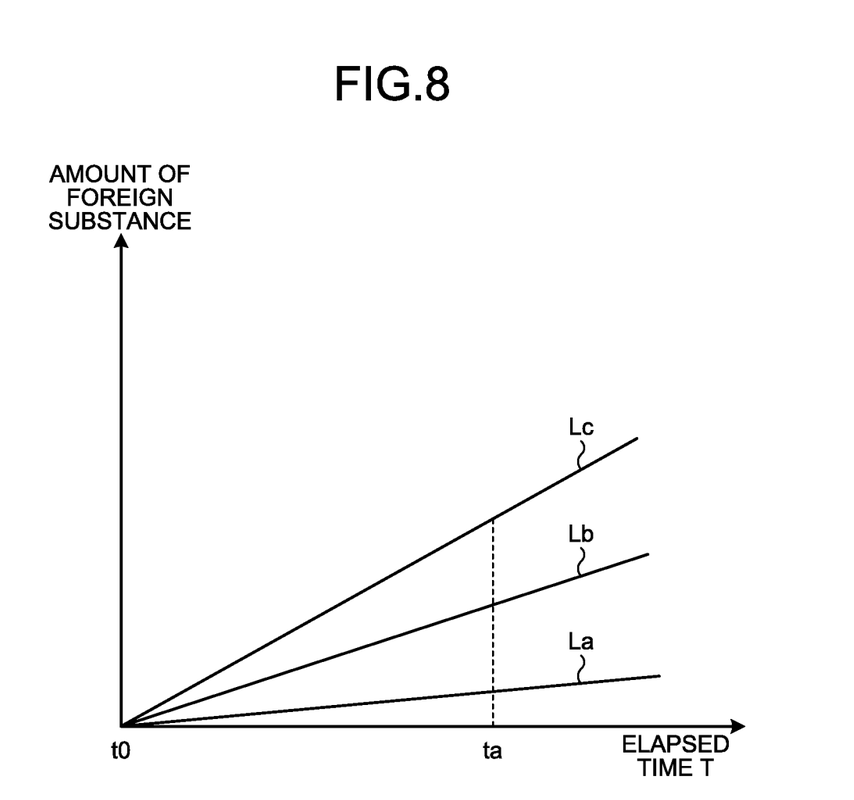
FIG. 8 is a diagram illustrating an example of foreign substance data output by an image analysis unit according to the present embodiment.

FIG. 8 is a diagram illustrating an example of the characteristic data of the foreign substance output by the image analysis unit 303 according to the present embodiment. As illustrated in FIG. 8, the image analysis unit 303 determines the relationship between the elapsed time T from the start time t0 when the use of the new mechanical part is started and the amount of foreign substance accumulated on the end face 30a of the spacer member 30. FIG. 8 illustrates a foreign substance increase rate indicating the amount of foreign substance increased on the end face 30a of the spacer member 30 per unit time. In FIG. 8, the lines La, Lb, and Lc are illustrated as straight lines, but do not always have to be straight lines.

From the amount of the foreign substance accumulated on the end face 30a, the degree of deterioration of the mechanical part of the machine device 1 is estimated. When the amount of the foreign substance accumulated on the end face 30a is large, it is estimated that a large amount of foreign substance is generated from the mechanical part and the mechanical part is being deteriorated. When the amount of foreign substance accumulated on the end face 30a is small, the amount of the foreign substance generated from the mechanical part is small, and it is estimated that the mechanical component has not yet deteriorated.

The estimation unit 304 can estimate the deterioration state of the machine device 1 based on the increase rate of the foreign substance on the end face 30a. Further, the estimation unit 304 can determine whether there is an abnormality in the machine device 1 based on the increase rate of foreign substance on the end face 30*a*.

For example, as indicated by the line La in FIG. 8, when the increase rate of the foreign substance is small, the estimation unit 304 can determine that the progress speed of the deterioration of the mechanical part is low, and that no abnormality has occurred in the machine device 1.

As indicated by the line Lb in FIG. 8, when the increase rate of the foreign substance is large, the estimation unit 304 can determine that the speed of progress of deterioration of the mechanical part is high, and that there is a possibility that an abnormality may occur in the machine device 1.

As indicated by the line Lc in FIG. 8, when the increase rate of the foreign substance is excessive, the estimation unit 304 can determine that an abnormality has occurred in the machine device 1.

Further, the estimation unit 304 may estimate the deterioration state of the machine device 1 or determine whether an abnormality has occurred in the machine device 1, based on the amount of the foreign substance at the time to after the lapse of the specified time from the start time t0.

As described above, the estimation unit 304 can not only estimate the state of the machine device 1 but also determine whether an abnormality has occurred, based on the foreign substance data output from the image analysis unit 303. The estimation unit 304 can output not only the estimation data indicating the estimation result of the state of the machine device 1 but also determination data indicating the determination result of the occurrence of the abnormality.

Further, as described above, the database unit 302 stores the vehicle information such as the repair history of each of the plurality of machine devices 1 and the image data in association with each other. The estimation unit 304 can estimate the state of each of the plurality of different machine devices 1 of the working equipment 4 based on the vehicle information such as the repair history and characteristic data of the foreign substance.

The output control unit 306 causes the output device 6 to output at least one of the image data, the foreign substance data, the estimation data, and the determination data.

Figure 9:
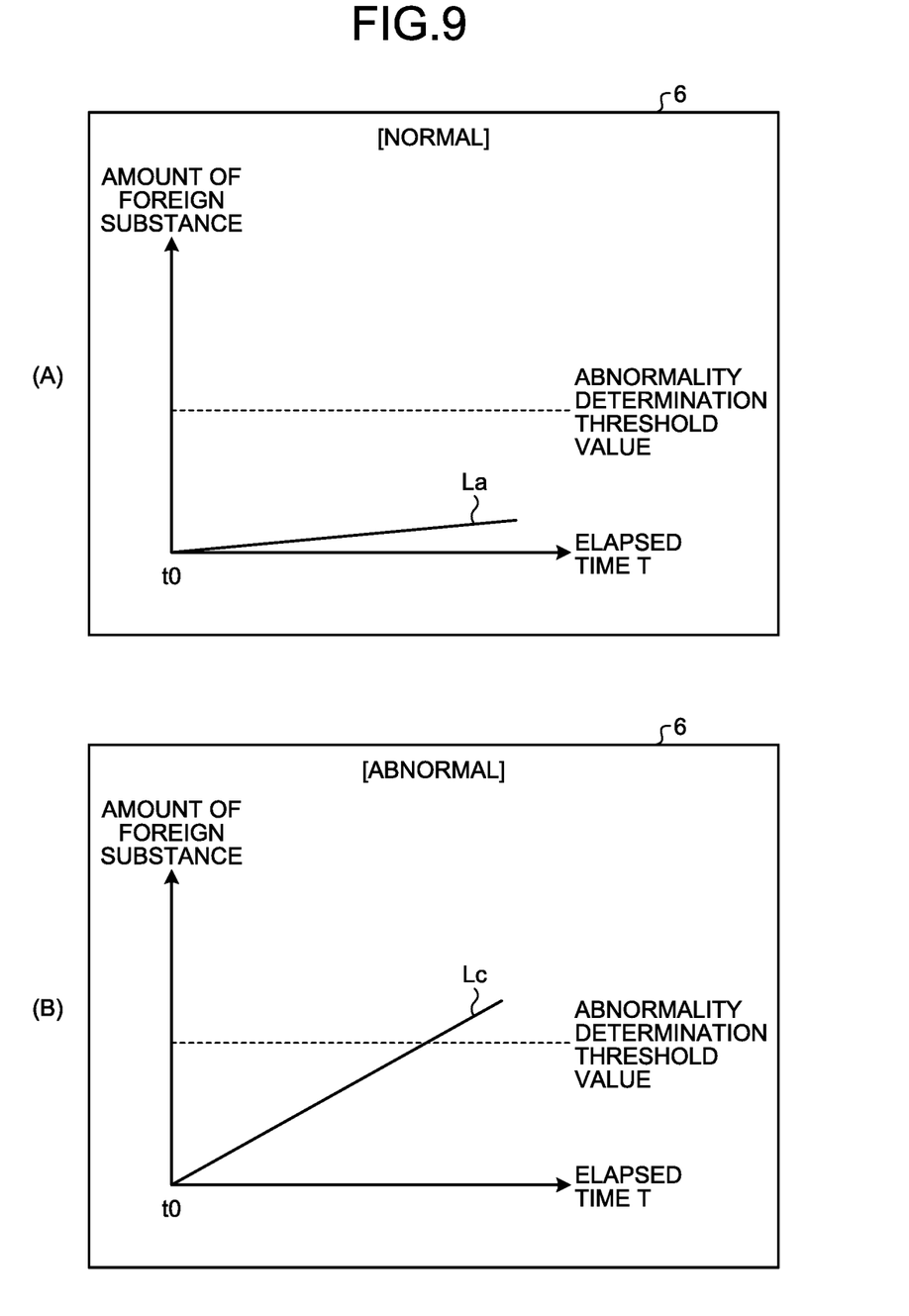
FIG. 9 is a schematic diagram illustrating an output example of an output device according to the present embodiment.

FIG. 9 is a schematic diagram illustrating an output example of the output device 6 according to the present embodiment. FIG. 9 illustrates an example in which a graph indicating the increase rate of the foreign substance is output as foreign substance data. According to the present embodiment, an abnormality determination threshold value related to the amount of foreign substance is set. FIG. 9(A) illustrates an example in which the increase rate of the foreign substance is small, the amount of the foreign substance does not exceed the abnormality determination threshold value, and text data of "normal" is output to the output device 6 as the determination data. FIG. 9(B) illustrates an example in which the increase rate of the foreign substance is large, the amount of the foreign substance exceeds the abnormality determination threshold value, and text data of "abnormal" is output to the output device 6 as the determination data. Note that the abnormality determination may be performed at a predetermined time, such as when the elapsed time T from the start time t0 is 1000 hours or 2000 hours.

Note that, to the output device 6, the image data inside the housing chamber 11 may be output or the estimation data output from the estimation unit 304 may be output.

[State Monitoring Method]

Figure 10:
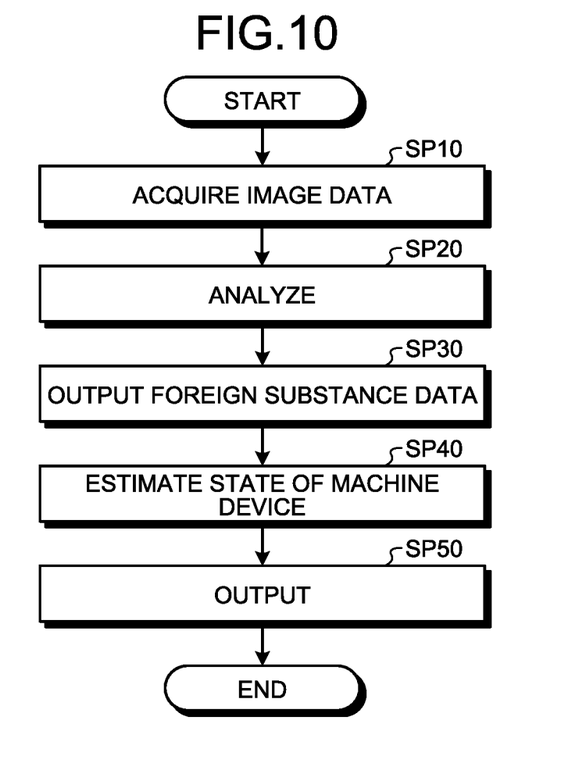
FIG. 10 is a flowchart illustrating an example of a state monitoring method according to the present embodiment.

FIG. 10 is a flowchart illustrating an example of a state monitoring method according to the present embodiment. The image data inside the housing chamber 11 is captured by the imaging device 3. The in-vehicle control device 200 transmits the image data to the server 300 via the communication network 5. The image data acquisition unit 301 of the server 300 acquires the image data inside the housing chamber 11 in which the mechanical parts immersed in the oil are accommodated (Step SP10).

The image data obtained by the image data acquisition unit 301 is stored in the database unit 302. In a case where the machine device 1 related to the image data has a repair history, the database unit 302 stores the image data with a tag of "information such as repair history" attached.

The image analysis unit 303 analyzes the image data stored in the database unit 302 (Step SP20).

The image analysis unit 303 outputs foreign substance data relating to the foreign substrate existing in the oil based on the image data (Step SP30). The image analysis unit 303 outputs, as foreign substance data, at least one of the shape, size, amount, color, magnetism, and increase rate of the foreign substance.

The estimation unit 304 estimates the state of the machine device 1 having the mechanical part based on the foreign substance data output from the image analysis unit 303 (Step SP40).

The estimation unit 304 estimates the state of each of the plurality of machine devices 1 having different functions. The estimation unit 304 estimates the state of each of the plurality of different machine devices 1 of the working equipment 4. The estimation unit 304 outputs estimation data indicating the estimation result of the state of the machine device 1. Further, the estimation unit 304 determines whether an abnormality has occurred in the machine device 1 based on the foreign substance data, and outputs determination data.

The output control unit 306 causes the output device 6 to output at least one of the image data acquired by the image data acquisition unit 301, the foreign substance data output from the image analysis unit 303, the estimation data output from the estimation unit 304, and the determination data output from the estimation unit 304 (Step SP50).

[Computer System]

Figure 11:
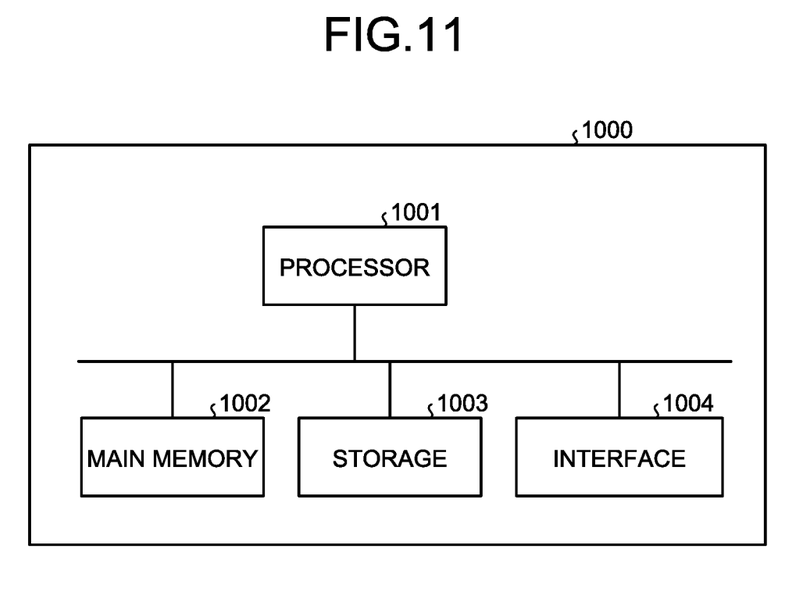
FIG. 11 is a block diagram illustrating an example of a computer system.

FIG. 11 is a block diagram illustrating an example of a computer system 1000. Each of the in-vehicle control device 200 and the server 300 includes a computer system 1000. The computer system 1000 includes a processor 1001 such as a central processing unit (CPU) and a main memory 1002 including a nonvolatile memory such as a read only memory (ROM) and a volatile memory such as a random access memory (RAM), a storage 1003, and an interface 1004 including an input/output circuit. The functions of the above-described in-vehicle control device 200 and the functions of the server 300 are stored in the storage 1003 as programs. The processor 1001 reads the program from the storage 1003, develops the program in the main memory 1002, and executes the above-described processing according to the program. Note that the program may be distributed to the computer system 1000 via a network.

[Effect]

As described above, according to the present embodiment, there are provided an image data acquisition unit 301 that acquires image data of the inside of the housing chamber 11 in which a mechanical part immersed in oil is housed, an image analysis unit 303 that outputs foreign substance data relating to a foreign substance existing in the oil based on the image data, and an estimation unit 304 that estimates a state of a machine device 1 having the mechanical part based on the foreign substance data, and outputs estimation data. Since the image data has a large amount of information, the state of the machine device 1 can be estimated with high accuracy based on the image data. Since the state of the machine device 1 can be estimated with high accuracy, appropriate measures can be taken before the machine device 1 is damaged. Therefore, the life cycle cost of the machine device 1 can be reduced and the operation rate can be improved.

In addition, since the information amount of the image data includes many multi-dimensional parameters, the image analysis unit 303 can output at least one of the shape, size, amount, color, magnetism, and increase rate of the foreign substance as the foreign substance data.

Further, the estimation unit 304 can determine whether or not an abnormality has occurred in the machine device 1 based on the foreign substance data output from the image analysis unit 303, and can output determination data. With this configuration, appropriate measures can be taken before the machine device 1 is fatally damaged.

In addition, by outputting at least one of the image data inside the housing chamber 11, the foreign substance data, the estimation data, and the determination data to the output device 6, the state of the machine device 1 can be visually recognized. Further, when the output device 6 is a sound output device, the state of the machine device 1 can be recognized through hearing.

Further, characteristic data indicating the characteristics of the foreign substance is stored in the storage unit 305 in advance. Therefore, the estimation unit 304 can estimate the deteriorated section of the machine device 1 based on the foreign substance data output from the image analysis unit 303 and the characteristic data stored in the storage unit 305.

The database unit 302 stores image data relating to the plurality of machine devices 1 having different functions and image data relating to the machine devices 1 of different pieces of working equipment 4 having equivalent functions. By using such a large number of pieces of image data, the state of the machine device 1 can be estimated from various aspects, and the tendency of deterioration of the machine device 1 can be estimated.

In addition, by associating vehicle information such as a repair history to the image data stored in the database unit 302, the accuracy of estimation of the state of the machine device 1 using the association can be improved.

Other Embodiments

In the above-described embodiment, at least a part of the image data, the foreign substance data, the estimation data, and the determination data may be notified to a customer who uses the working equipment 4, or may be notified to a maintenance person of the working equipment 4, or may be notified to factory equipment that manufactures or maintains the working equipment 4 via the communication network 5. For example, when the estimation unit 304 determines that the damage to the machine device 1 is at a high level, the output control unit 306 may send notification data indicating that the damage is large or urgent response is required respectively to the customer, the factory equipment, and the maintenance person, and an agency. When the estimation unit 304 determines that the damage of the machine device 1 is at a middle level, the output control unit 306 may cause the output device 6 to output guidance data for prompting replacement or repair of parts of the machine device 1. When the estimation unit 304 determines that the damage to the machine device 1 is at a low level, the output control unit 306 may cause the output device 6 to output guidance data prompting an inspection of the machine device 1.

Further, when the estimation unit 304 determines that the damage to the machine device 1 is at a high level, the in-vehicle control device 200 may restrict engine speed of the engine of the working equipment 4 or regulate the start of the engine.

In the above-described embodiment, at least a part of the image data, the foreign substance data, the estimation data, and the determination data may be displayed on a display device arranged in a cab of the working equipment 4. Further, the above-described notification data or guidance data may be displayed on the display device arranged in the cab of the working equipment 4.

In the above embodiment, at least a part of the functions of the server 300 may be provided in the in-vehicle control device 200, or at least a part of the in-vehicle control device 200 may be provided in the server 300. For example, the in-vehicle control device 200 may include functions of the image data acquisition unit 301, the database unit 302, the image analysis unit 303, the estimation unit 304, and the storage unit 305, and transmit at least one of image data, foreign substance data, estimation data, and determination data acquired in the in-vehicle control device 200 to the server 300 via the communication network 5.

Further, the imaging device 3 (visualization sensor 2) and a mobile terminal may be connected, and the image data acquired by the imaging device 3 may be output to the mobile terminal. Further, at least a part of the functions of the image data acquisition unit 301, the database unit 302, the image analysis unit 303, the estimation unit 304, and the storage unit 305 may be provided in the mobile terminal. Further, at least one of image data, foreign substance data, estimation data, and determination data may be transmitted from the mobile terminal to the server. Examples of the mobile terminal include at least one of a personal computer, a tablet computer, and a smartphone.

In the above-described embodiment, the mechanical parts are immersed in oil. The mechanical parts may not need to be immersed in oil. For example, the housing chamber may have an oil immersion space in which oil exists and a non-oil immersion space provided above the oil immersion space. The non-oil immersion space is a space where no oil exists and a mechanical part exists. Foreign substances generated from the mechanical parts falls into the oil immersion space. The imaging device 3 can capture an image of the foreign substance in oil in the oil immersion space.

REFERENCE SIGNS LIST 1 machine device
1A first machine device
1B second machine device
1C third machine device
2 visualization sensor
3 imaging device
3a incident surface
4 working equipment
4A first working equipment
4B second working equipment
4C third working equipment
5 communication network
6 output device
10 device body
11 housing chamber
12 discharge hole
20 plug
20a shaft portion
20b flange portion 20c head portion
20d cap attachment portion
20e screw thread
20f screw thread
21 attachment hole
21a grommet fitting hole
21b first housing hole portion
21c second housing hole portion
21d ring attachment hole portion
21e tapered hole portion
21f pressure receiving surface
22 C-ring
23 concave portion
30 spacer member
30a end face
30c end face
31 seal member
32 magnet
50 cap member
100 state monitoring system
200 In-vehicle control device
300 server
301 image data acquisition unit
302 database unit
303 image analysis unit
304 estimation unit
305 storage unit
306 output control unit

The invention claimed is:

1. A machine device state monitoring system comprising:
a plurality of machine devices mounted on each of a plurality of pieces of working equipment,
an image data acquisition unit associated with each of the plurality of machine devices mounted on each of the plurality of pieces of working equipment, which is part of a server which includes a computer system, configured to acquire image data of an inside of a housing chamber in which a mechanical part is housed;
an image analysis unit, which is part of the server, configured to output foreign substance data relating to a foreign substance in oil in the housing chamber based on the image data;
a storage unit, which is part of the server, configured to store characteristic data indicating a characteristic of the foreign substance; and
an estimation unit, which is part of the server, configured to estimate a state of each of the plurality of machine devices having the mechanical part based on the foreign substance data and the characteristic data to output estimation data,
the machine device state monitoring system further comprises a database unit, which is part of the server, configured to store: image data of each of the plurality of machine devices and repair histories of each of the plurality of machine devices, and
the estimation unit estimates a state of each of the plurality of machine devices based on a member selected from the group consisting of: image data of each of the plurality of machine devices, foreign substance data detected from the image data, and the combination of foreign substance data and repair histories of each of the plurality of machine devices.

2. The machine device state monitoring system according to claim 1, wherein
the image analysis unit outputs at least one of shape, size, amount, color, magnetic property, and an increase rate of the foreign substance as the foreign substance data.

3. The machine device state monitoring system according to claim 1, wherein
the estimation unit determines whether or not an abnormality has occurred based on the foreign substance data output from the image analysis unit to output determination data.

4. The machine device state monitoring system according to claim 3, further comprising:
an output control unit, which is part of the server, configured to cause an output device to output at least one of the image data, the foreign substance data, the estimation data, and the determination data.

5. The machine device state monitoring system according to claim 1, wherein the characteristic data, stored in the storage unit, indicating a characteristic of the foreign substance includes image data relating to the plurality of machine devices having different functions and includes image data relating to the machine devices of different pieces of working equipment having equivalent functions.

6. A machine device state monitoring method comprising:
providing a plurality of machine devices mounted on each of a plurality of pieces of working equipment;
acquiring image data, of an inside of a housing chamber in which a mechanical part is housed, for each of the plurality of machine devices mounted on each of the plurality of pieces of working equipment;
outputting foreign substance data relating to a foreign substance in oil in the housing chamber based on the image data;
storing image data of each of the plurality of machine devices and repair histories of each of the plurality of machine devices machines, and
estimating a state of each of the plurality of machine devices based on a member selected from the group consisting of: image data of each of the plurality of machine devices, foreign substance data detected from the image data, and the combination of foreign substance data and repair histories of each of the plurality of machine devices.

7. The machine device state monitoring method according to claim 6, wherein the foreign substance data includes image data relating to the plurality of machine devices having different functions and includes image data relating to the machine devices of different pieces of working equipment having equivalent functions.

* * * * *